(No Model.)

E. CORNELY.
SPOOL STAND FOR SEWING MACHINES.

No. 279,919. Patented June 26, 1883.

Attest:
Geo. T. Smallwood Jr.
Philip —

Inventor:
Emile Cornely
by A. Pollok
his attorney.

UNITED STATES PATENT OFFICE.

EMILE CORNELY, OF PARIS, FRANCE.

SPOOL-STAND FOR SEWING-MACHINES.

SPECIFICATION forming part of Letters Patent No. 279,919, dated June 26, 1883.

Application filed February 1, 1883. (No model.)

*To all whom it may concern:*

Be it known that I, EMILE CORNELY, a resident of Paris, in the Republic of France, have invented new and useful Improvements in Spool-Stands for Sewing or Embroidering Machines, which are fully set forth in the following specification.

This invention has reference to spool stands or holders for sewing-machines, and is more particularly designed for use in embroidering-machines—such as described in my Patent No. 228,445, dated June 8, 1880—in which, in addition to the sewing-thread, a second thread is employed, being carried on a spool-holder that rotates around the needle, winding the second or embroidering thread around the needle, or around the sewing-thread, at each stitch. The invention may, however, be used, in part at least, in other sewing-machines.

In the improved stand the spool rests upon a spring or cushion, preferably formed of a curved leaf-spring, held in place by the spool-pin which passes through a hole in its center. The spool is retained on the pin by an arm passing over its top and provided with a hole through which the spool-pin passes. This arm projects from a frame having bearings on a second pin, that permit it to turn thereon to release the spool when it is desired to remove it, and a spring is provided which causes the arm to press upon the top of the spool, the pressure of the spring being adjustable by means of a thumb-nut, against which it bears. The spool is thus held between two springs, the pressure of which is adjustable to produce any desired tension of the thread. The tension-pin used in connection with the spool-holder described in my aforesaid patent may therefore be dispensed with.

Figure 1:
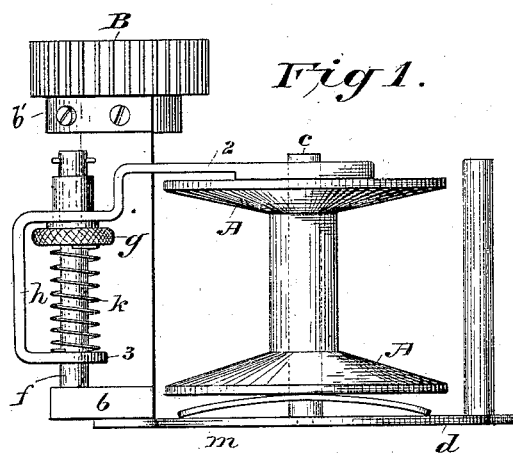
Figure 2:
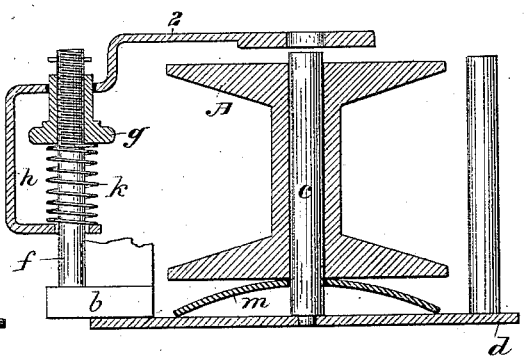
Figure 3:
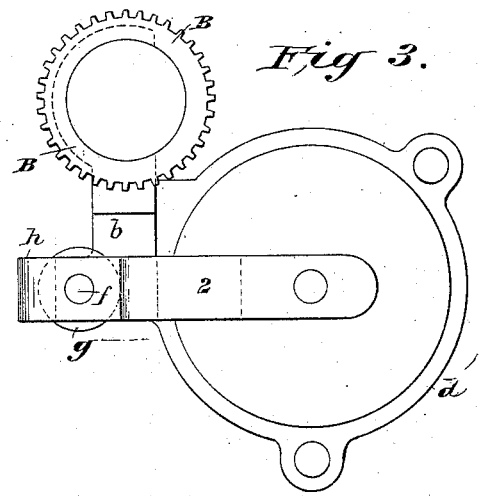
Figure 4:
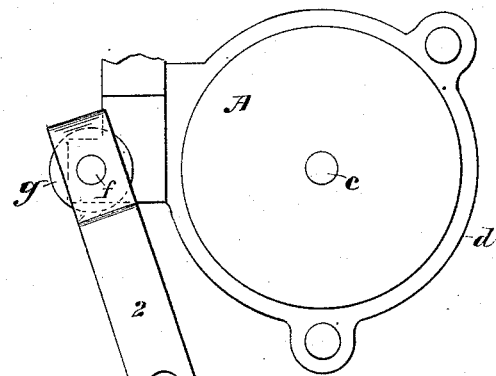

In the accompanying drawings, which form a part of this specification, Figure 1 is an elevation of the improved spool-holder; Fig. 2, a vertical section of the same; Figs. 3 and 4, plan views; and Fig. 5, an elevation of another, and, in some respects, preferred form.

The bed-plate *d* is secured to the under side of a bracket, *b*, and at or about its center supports the spool-pin *c*. The spool A, when in place, rests upon a curved leaf-spring, *m*, which is retained in position by the spool-pin *c*, passing through a hole in its center. Pin *f*, projecting from bracket *b*, has its upper part screw-threaded, and upon it turns a thumb-nut, *g*, provided with a milled head for turning. The frame or holder *h*, the shape of which is clearly shown in the drawings, has bearings upon pin *f*, and can turn thereon, so as to bring the arm 2 above the spool to retain it in place, or to one side thereof to remove the spool when necessary. Arm 2 is provided with a hole through which the spool-pin *c* passes. The said arm is caused to bear downward upon the spool by means of a spiral spring, *k*, surrounding pin *f*, and bearing upward against the head of nut *g* and downward against the arm 3 of frame *h*. By turning said nut downward the pressure of arm 2 upon the spool is increased, and by turning it the other way the pressure is relaxed. The tension of the thread from spool A can thus be varied at will, and no other tension device will ordinarily be necessary. To withdraw spool A from the stand the frame *h* is pushed upward until arm 2 is released from pin *c*, and then said arm turned to one side, as shown in Fig. 4.

Figure 5:
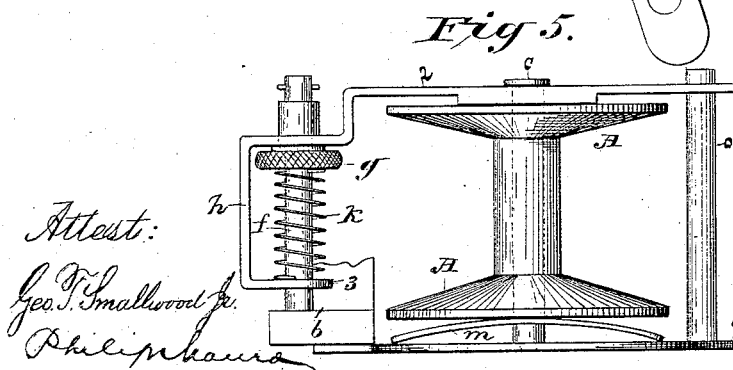

In Fig. 5 the spool-pin *c* is loose, and is passed down through arm 2, spool A, spring *m*, and plate *d*. In this figure the end of arm 2 is held on pin *o*. By removing pin *c* the spool can be inserted or removed without turning the frame about its pin.

The bracket *b* is bent upward and terminates in a yoke, *b'*, which is secured to the hub of wheel B by screws, the stand or holder being supported by and revolving with said wheel, as described in my aforesaid patent, to which reference may be had for a better understanding of the operation of the rotating spool-stand, and for a description of the machine to which the same is applied.

It is obvious that the details of construction may be modified without departing from the spirit of the invention.

I claim—

1. In a spool holder or stand, the combination of the bed-plate, spool-pin, movable frame supported at the side of said spool-pin, holding-arm projecting from said frame, and separate tension-spring engaging said frame, substantially as described.

2. In a spool holder or stand, the combination of the bed-plate, spool-pin, spring-cushion bowed upward in the middle and loosely surrounding the spool-pin, the movable frame, holding-arm, and tension-spring, substantially as described.

3. The combination of the curved leaf-spring, spool-pin, frame turning upon a second pin, holding-arm projecting from said frame and having a hole engaging with the end of said spool-pin, thumb-nut turning on said second pin, and spiral spring encircling said pin, bearing upward against said nut and downward against said frame, substantially as described.

4. A rotating spool holder or stand for sewing and embroidering machines, the same comprising a bracket attached to a gear-wheel, so as to be supported and revolved thereby, and the devices carried by said bracket for supporting the spool and exerting an elastic pressure thereon, for regulating said pressure, and for guiding the thread delivered from said spool, substantially as described.

5. In a spool-stand, the combination, with the holding-arm extending across the top of the spool and bearing thereon with spring-pressure, of the removable spool-pin passing through said arm and spool, substantially as described.

6. In an embroidering-machine, in combination with the wheel that carries the rotating devices for winding the embroidering-thread around the sewing-thread, the spool-stand described, comprising the bottom plate, leaf-spring, spool-pin, frame with its holding-arm, pin upon which said frame is movable lengthwise thereof, spiral spring pressing said frame and holding-arm downward, and thumb-nut for regulating the pressure of said spring, substantially as described.

In testimony whereof I have signed this specification in the presence of two subscribing witnesses.

E. CORNELY.

Witnesses:
ROBT. M. HOOPER,
DAVID T. S. FULLER.